(12) United States Patent
McGlaughlin (10) Patent No.: US 8,351,442 B1
(45) Date of Patent: Jan. 8, 2013

(54) METHOD AND SYSTEM FOR NETWORK COMMUNICATION

(75) Inventor: Edward C. McGlaughlin, Minneapolis, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 250 days.

(21) Appl. No.: 12/505,430

(22) Filed: Jul. 17, 2009

Related U.S. Application Data (60) Provisional application No. 61/081,810, filed on Jul. 18, 2008.

(51) Int. Cl.
*H04L 12/28* (2006.01)
*G06F 5/08* (2006.01)
*G06F 13/00* (2006.01)

(52) U.S. Cl. .................. 370/401; 370/389; 370/395.53; 370/229; 710/316; 398/45; 709/208

(58) Field of Classification Search .................. 370/401, 370/389, 395.53, 229; 709/208–228; 398/45; 710/316
See application file for complete search history.

(56) References Cited

U.S. PATENT DOCUMENTS

| | | | | |
|---|---|---|---|---|
| 5,619,497 A * | 4/1997 | Gallagher et al. | ............ | 370/394 |
| 6,240,471 B1 * | 5/2001 | Schlueter et al. | ................ | 710/62 |
| 6,988,161 B2 * | 1/2006 | McConnell et al. | .......... | 710/316 |
| 7,031,338 B2 * | 4/2006 | Weaver | ........................ | 370/465 |
| 7,213,178 B1 * | 5/2007 | Prasad et al. | ..................... | 714/43 |
| 7,340,167 B2 * | 3/2008 | McGlaughlin | ................. | 398/45 |
| 7,468,982 B2 * | 12/2008 | Mehra et al. | ................... | 370/400 |
| 7,542,676 B2 * | 6/2009 | McGlaughlin | ................. | 398/45 |
| 7,646,767 B2 * | 1/2010 | Dropps et al. | ................ | 370/389 |
| 7,660,302 B2 * | 2/2010 | McGlaughlin | ................ | 370/389 |
| 7,719,969 B1 * | 5/2010 | Dropps et al. | ................ | 370/229 |
| 7,793,101 B2 * | 9/2010 | Wipfel et al. | ................ | 713/168 |
| 7,831,709 B1 * | 11/2010 | Ham et al. | ..................... | 709/224 |
| 2001/0050787 A1 * | 12/2001 | Crossland et al. | .............. | 359/15 |
| 2002/0186432 A1 * | 12/2002 | Roorda et al. | ................ | 359/128 |
| 2002/0186434 A1 * | 12/2002 | Roorda et al. | ................ | 359/128 |
| 2003/0120852 A1 * | 6/2003 | McConnell et al. | .......... | 710/316 |
| 2003/0172145 A1 * | 9/2003 | Nguyen | ........................ | 709/223 |
| 2004/0004963 A1 * | 1/2004 | Mehra et al. | ................... | 370/392 |
| 2004/0156322 A1 * | 8/2004 | Mehra | ........................... | 370/254 |
| 2005/0050230 A1 * | 3/2005 | Vo | ...................................... | 710/1 |
| 2007/0174850 A1 * | 7/2007 | El Zur | ........................... | 719/321 |
| 2008/0031627 A1 * | 2/2008 | Smith et al. | ..................... | 398/83 |
| 2008/0175154 A1 * | 7/2008 | Ong et al. | ..................... | 370/236 |
| 2009/0037977 A1 * | 2/2009 | Gai et al. | .......................... | 726/1 |
| 2009/0245791 A1 * | 10/2009 | Thaler et al. | ..................... | 398/45 |
| 2009/0292813 A1 * | 11/2009 | Snively et al. | ................ | 709/228 |
| 2009/0296726 A1 * | 12/2009 | Snively et al. | ................ | 370/401 |
| 2010/0142544 A1 * | 6/2010 | Chapel et al. | ................. | 370/401 |
| 2011/0044344 A1 * | 2/2011 | Hudson et al. | ........... | 370/395.53 |

\* cited by examiner

*Primary Examiner* — Ayaz Sheikh
*Assistant Examiner* — Venkatesh Haliyur
(74) *Attorney, Agent, or Firm* — Klein, O'Neill & Singh, LLP (57) ABSTRACT

Method and device for processing network and storage related traffic is provided. The device includes a network port for interfacing with a network switch; a plurality of ports that receive a converged storage and network protocol related initialization request. Based on selectable criteria, a controller selects a port from among the plurality of ports to respond to the converged storage and network protocol related initialization request. The device also includes a translation module operationally coupled to the port for translating information between a converged network and storage protocol and a storage protocol; and a flexible port that is configured by a port controller to communicate with a storage system using the storage protocol or configured to operate as a network port communicating with a network device.

27 Claims, 6 Drawing Sheets

METHOD AND SYSTEM FOR NETWORK COMMUNICATION

CROSS-REFERENCE TO RELATED APPLICATION

This application claims priority to U.S. provisional application Ser. No. 61/081,810, filed on Jul. 18, 2008, entitled "Method and System for Network Communication", the disclosure of which is incorporated herein in its entirety.

BACKGROUND

The present disclosure relates to network systems.

RELATED ART

Computing systems typically communicate with network devices and storage devices using network protocols (for example, Ethernet) and storage protocols (for example, Fibre Channel). Continuous efforts are being made to converge network and storage protocols. New devices are being developed to handle converged network and storage traffic. One challenge is to communicate with existing (i.e. legacy) devices that may not have the ability to handle the converged capabilities.

SUMMARY

In one embodiment an integrated device for processing network and storage related traffic is provided. The device includes a network port for interfacing with a network switch; and a plurality of ports that receive a converged storage and network protocol related initialization request. Based on selectable criteria, a controller selects a port from among the plurality of ports to respond to the converged storage and network protocol related initialization request.

The device also includes a translation module operationally coupled to the port for translating information between a converged network and storage protocol and a storage protocol; and a flexible port that is configured by a port controller to communicate with a storage system using the storage protocol configured to operate as a network port communicating with a network device.

In another embodiment, an integrated device for processing network and storage related traffic is provided. The device includes an Ethernet port for interfacing with an Ethernet switch; and a plurality of Fibre Channel Forwarding (FCF) ports that receive a Fibre Channel Over Ethernet (FCoE) initialization request from a server node. Based on a selectable criteria, a controller selects a FCF port from among the plurality of FCF ports to respond to the FCoE initialization request.

The device also includes a translation module operationally coupled to the port for translating information between the FCoE and Fibre Channel protocols; and a flexible port that is configured by a port controller to operate as a Fibre Channel port in a Fibre Channel switch mode or a transparent mode for communicating with a Fibre Channel storage system; or configured to operate as a network port communicating with a network device.

In yet another embodiment, a system is provided. The system includes a server node for sending network and storage related information; a network switch communicating with the server node and an integrated device. The integrated device is configured to process both network and storage related information.

The integrated device includes a network port for interfacing with a network switch; and a plurality of ports that receive a converged storage and network protocol related initialization request. Based on selectable criteria, a controller selects a port from among the plurality of ports to respond to the converged storage and network protocol related initialization request.

The device also includes a translation module operationally coupled to the port for translating information between a converged network and storage protocol and a storage protocol; and a flexible port that is configured by a port controller to communicate with a storage system using the storage protocol or configured to operate as a network port communicating with a network device.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWING

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Definitions:

The following definitions are provided for convenience as they are typically (but not exclusively) used in the computing environment, implementing the various adaptive embodiments described herein.

"D_ID" is a 24-bit Fibre Channel header that includes the destination address for a frame.

"E_Port": A fabric expansion Port that attaches to another interconnect port to create an Inter-Switch Link.

"F_Port": A port to which non-loop N_Ports are attached to a fabric and does not include FL_ports.

"Fabric": A system which interconnects various ports attached to it and is capable of routing frames by using destination identifiers.

"Fabric Topology": This is a topology where a device is directly attached to a Fibre Channel fabric that uses destination identifiers embedded in frame headers to route frames through a Fibre Channel fabric to a desired destination.

"FCF_Port" means Fibre Channel Forwarder Port that performs FCoE Fibre Channel Initialization Protocol and forwards FCoE packets from a virtual N_Port (may also be referred to as VN_Port) to a fabric for delivery to a target device.

"ISL" means Inter-Switch Link, a link connecting two ports.

"Fabric Initialization Protocol" is a standard initialization process used for initializing devices within a fabric.

"Fibre Channel Login" means a login procedure as defined by the Fibre Channel standards. Before a Fibre Channel port can send data, the port determines information regarding its operating environment. This includes factors like interconnect topology; other ports in the environment; classes of Service and error recovery services that may be available. To determine this information, a port performs a login procedure. The login procedure includes Fabric Login ("FLOGI") and Port Login ("PLOGI") and Node Login.

The Port requesting FLOGI sends Extended Link Service Commands, which includes a Sequence in its own Exchange with a header and Payload format. A recipient of the FLOGI accepts the login by sending an accept ("ACC") command. The format for FLOGI is defined by the Fibre Channel standards.

The FLOGI process allows a node to log in to a Fabric and receive an assigned address from a switch. The FLOGI occurs with any node (N_Port or NL_Port) that is attached to the fabric. The N_Port or NL_Port carries out the FLOGI with a nearby switch. The node (N_Port or NL_Port) sends a FLOGI frame that contains its node name, its N_Port name, and any service parameters. When the node sends its information to an address of 0xFFFFFE, it uses a 24-bit source address of 0x000000 because it hasn't received a legitimate 24-bit address from the fabric yet. The FLOGI is sent to the l-known fabric address of 0xFFFFFE. The FC switches and fabric will receive the FLOGI at the address of 0xFFFFFE.

After a switch receives the FLOGI, it gives the N_Port or NL_Port a 24-bit address that pertains to the fabric itself. This 24-bit address is in a Domain-Area-Port address form, where the Domain is the unique domain name (ID) of the fabric, Area is the unique area name D) of the switch within the domain, and Port is the unique name (ID) of each port within the switch in the fabric.

After the node has completed the FLOGI and has a valid 24-bit fabric address, it performs a PLOGI with the switch's name server. PLOGI is a standard Fibre Channel N_Port to N_Port login. PLOGI determines the N_port to N_Port parameters and provides a specific set of operating parameters for communicating between N_ports.

The port requesting PLOGI sends a PLOGI Extended Link Service Request addressed to the D_ID of an N_Port with which it needs to communicate. The addressed N_Port then returns an ACC reply. The request and reply contain operating parameters for communication between the N_Ports. The format for the request and reply are provided by the Fibre Channel standards.

During PLOGI, the port submits information on its 64-bit port worldwide number (WWN), 64-bit node WWN, port type, and class of service. The switch then registers that 24-bit fabric address, along with all the other information submitted, to the Name Server and replicates that information to other Name Servers on the switch fabric.

A Node Login is similar to a Fabric Login, but instead of logging in to the fabric, the node would log in to another node directly (node to node communication).

"L_Port": A port that contains Arbitrated Loop functions associated with an Arbitrated Loop topology.

"N_Port" means a port of a device that is directly attached to a switch. A physical N_Port may use multiple identifiers and presented as a shared virtual port. In that case, it is referred to as VN_Port. The identifier for a virtual N_Port may be referred to as NPIV or NP_IV.

"NL_Port": A L_Port that can perform the function of a N_Port.

"Name Server": The Name Server is a logical database in each Fibre Channel switch that correlates a node's 24-bit fabric address to the node's 64-bit worldwide number (WWN). Fibre Channel Generic Services (FC-GS-3) specification describes in section 5.0 various Fibre Channel services that are provided by Fibre Channel switches including using a Name Server to discover Fibre Channel devices coupled to a fabric. A Name server provides a way for N_Ports and NL_Ports to register and discover Fibre Channel attributes. Request for Name server commands are carried over the Common Transport protocol, also defined by FC-GS-3. The Name Server information is distributed among fabric elements and is made available to N_Ports and NL_Ports after the ports have logged in. Various commands are used by the Name Server protocol, as defined by FC-GS-3, for registration, de-registration and queries. Fiber Channel Switched Fabric (FC-SW-2) specification describes how a Fabric consisting of multiple switches implements a distributed Name Server.

"Network Protocols" means standards/protocols used for network communication. Various network protocols are used today for sending and receiving network information. One common network protocol is Ethernet. Ethernet is a family of frame-based computer networking technologies for local area networks (LANs). The Ethernet protocol defines a number of wiring and signaling standards for the Physical Layer of the OSI networking model, through means of network access at the Media Access Control (MAC)/Data Link layer, and a common addressing format.

The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gb (gigabit). The description of the various embodiments described herein are based on using Ethernet (which includes 100 Base-T and/or Gigabit Ethernet) as the network protocol, however, the adaptive embodiments disclosed herein are not limited to any particular protocol, as long as the functional goals are met by an existing or a new network protocol.

"Network/Storage Protocol" (or "Converged Network and Storage Protocol") means a protocol that can handle both network and storage traffic. Continuous efforts are being made to develop converged standards that support processing of both network and storage information using network and storage protocols. One such developing standard is the FCoE standard. The FCoE standard is being developed so that network adapters and network switches are able to handle both network and storage traffic using network and storage protocols.

"Packet": A group of one or more network data word(s) used for network communication.

"Path": A collection of links, switches and routers that a message traverses from a source port to a destination port.

"Ports" means logic in a device that connects one device to another. The device may include one or more ports and may be classified differently for example, as a node port (N_Port), fabric port (F_Ports), expansion port (E_Port), flexible port (Flex Port), virtual N_Port (VN_Port) and a general port Port). Node ports may be located in a node device, e.g. a server, a disk array and a storage device. Fabric ports may be located in fabric devices such as switches.

"Storage Protocol" means a standard/protocol used for handling storage related traffic. One common storage protocol used in storage area networks is Fibre Channel (also referred to as "FC"). Fibre Channel supports three different topologies, point-to-point, arbitrated loop and Fabric. The point-to-point topology attaches two devices directly. The arbitrated loop topology attaches devices in a loop. The Fibre Channel Fabric topology attaches host systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes it to another port.

Fibre Channel switches use memory buffers to hold frames received and sent across a network. Associated with these buffers are credits, which are the number of frames that a buffer can hold per Fabric port.

Although the description herein is based on Fibre Channel as the storage protocol, the adaptive aspects are not limited to Fibre Channel. Other similar protocols, for example, Infiniband, may be used to implement the adaptive embodiments disclosed herein.

"QOS": Quality of Service, metrics that predict the behavior, reliability, speed and latency of a network connection.

"S_ID" means is a 24-bit field in a Fibre Channel frame header that contains the source address for a frame.

"Switch": A device that facilities network communication conforming to certain standards/protocols.

As used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Networking System:

To facilitate an understanding of the various embodiments, the general architecture and operation of a network system is first described. The specific architecture and operation of the various embodiments will then be described with reference to the general architecture.

Figure 1A:
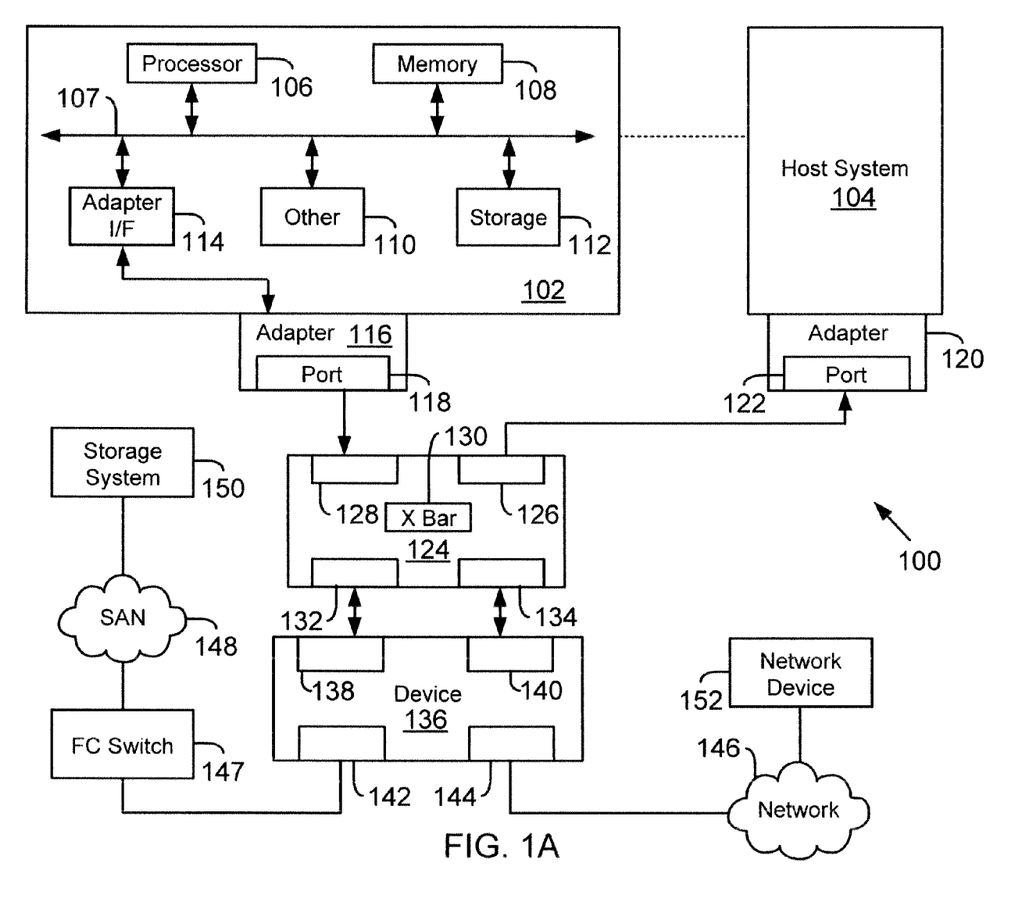
FIG. 1A shows a block diagram of a network/storage system, used according to one embodiment.

FIG. 1A shows a block diagram of system 100 with a plurality of computing systems (may also be referred to as ENode devices, ENodes or host systems) 102-104 interfacing with a storage system 150 and a network device 152 via a storage area network (SAN) 148 and network system 146, respectively.

Host system 102 may include a processor 106 that executes instructions out of memory 108 for performing certain operations, for example, reading/writing data to storage system 150 and sending commands and data to network device 152. Processor 106 interfaces with memory 108 via bus 107.

Storage device 112 may be used to store programmable instructions which are executed by processor 106 out of memory 108. Storage device 112 may be a CD-ROM, non-volatile memory device, a hard disk or any other storage media that can store information.

Host system 102 interfaces with a converged network adapter (CNA) 116 (while host 104 uses CNA 120) which includes at least one port 118 to interface with switch 124. CNA adapter 116 is configured to handle both network and storage traffic using a converged network and storage protocol, for example, FCoE. For example, port 118 is able to process network traffic to and from network device 152 as well as storage traffic to and from storage system 150. As an example, QLogic Corporation provides a CNA that may be used in system 100.

Switch 124 may be a standard, legacy switch, for example, an Ethernet switch with ports 128-126 to interface with CNA ports 118 and 122, respectively. Switch 124 includes a crossbar 130 for moving information between ports 126, 128, 132 and 134.

Ports 132 and 134 are operationally coupled to ports 138 and 140 of an integrated device 136 (also referred to as device 136). Ports 142 and 144 of device 136 are coupled to SAN 148 and network 146, respectively. Device 136 is able to handle both network and storage traffic, according to one embodiment and as described below in more detail.

Network 146 facilitates network communication, for example, TCP/IP (Transmission Control Protocol/Internet Protocol) traffic between hosts 102, 104 and network device 152.

Device 136 also communicates with a legacy Fibre Channel switch 147 that is coupled to SAN 148. FC switch 147 is able to process standard FC traffic. Qlogic Corporation provides a legacy FC switch 147.

Figure 1B:
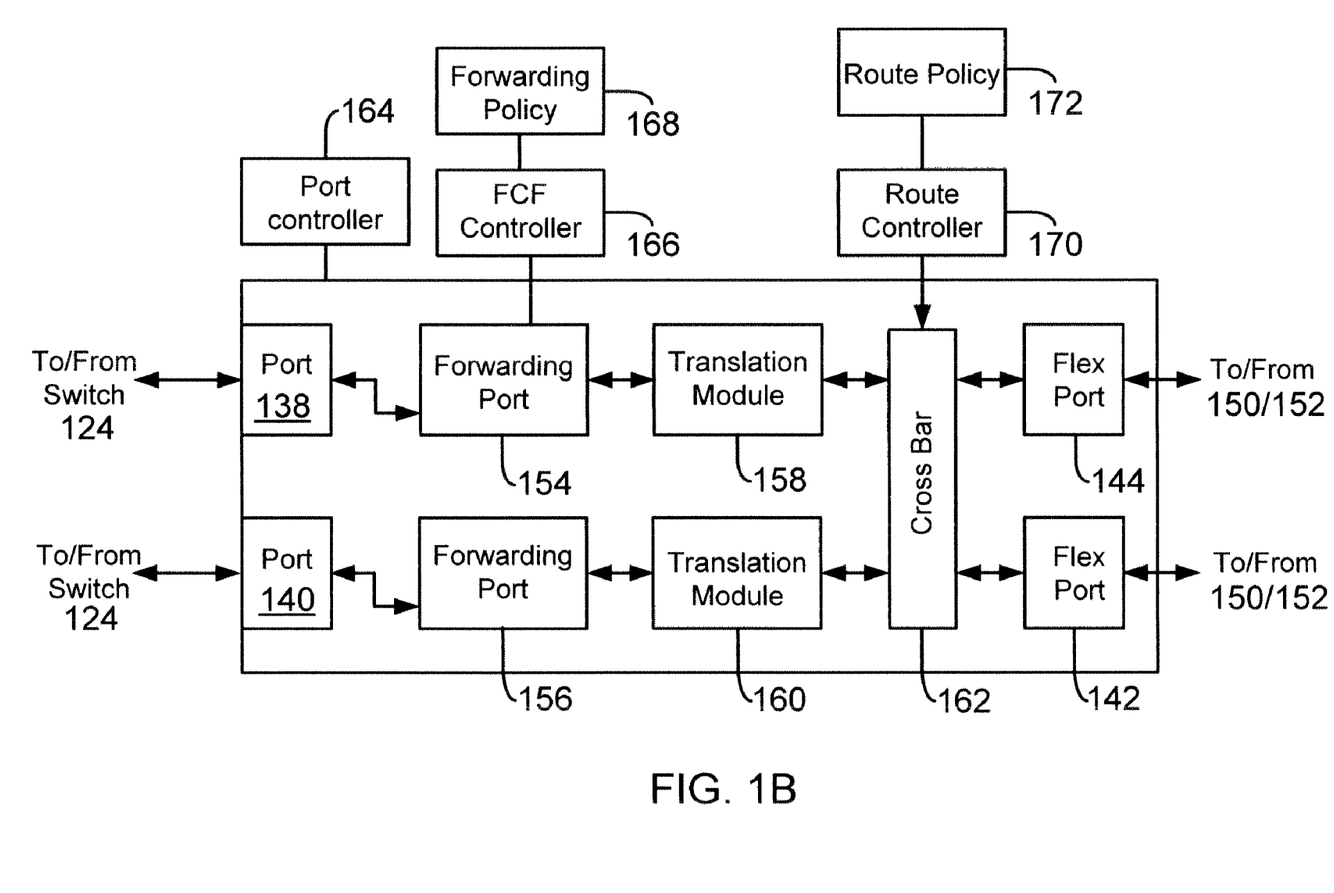
FIG. 1B shows a block diagram of an integrated device that can communicate with legacy devices using converged network and storage protocols, according to one embodiment.

Device 136:

FIG. 1B shows a block diagram of an integrated device 136 (also referred to as device 136). In one embodiment, integrated device 136 is a switching system having a FCF function and performs translation between FCoE and FC protocols.

Device 136 may include network ports (for example, 138 and 140) that are operationally coupled to switch 124. Device 136 may also include FCF ports 154 and 156 that perform the FCF function under the control of a FCF controller 166 (may also be referred to as controller 166).

Translation modules 158 and 160 perform translation between FCoE and FC protocols, as described below. Crossbar 162 provides connectivity between ports 138, 140, 142 and 144.

Flexible ports (also referred to as "flex ports") 142 and 144 are also provided for operationally connecting device 136 to network 146 and SAN 148. Flex ports 142 and 144 are configurable and may be configured to operate either as a network port, a storage port or both. In one embodiment, ports 142 and 144 may be configured to operate as Ethernet (i.e. network) or FC (i.e. storage) ports. The ports may be configured using port controller 164.

In one embodiment, one or both ports 142 and 144 may be configured to operate in a standard FC switch mode or in a Transparent Mode, where they operate as a N_Port attached to an external FC switch and proxy CNA port 118 via Fibre Channel discovery and virtual port address assignment (for example, virtual N-Port identifier (NPIV) assignment). An example, of a transparent switch operating in a transparent switch mode is provided in U.S. Pat. No. 7,340,167, assigned to QLogic Corporation.

Device 136 includes a route controller 170 that has access to routing policy 172. Routing policy 172 (may also be referred to as memory 172) is used by route controller 172 to select a routing path, as described below. Route controller 170 maintains connection information at memory 172 for the flexible port and selects a route to transmit information based on the connection information.

Details regarding device 136 operations are provided below with respect to the process flow diagrams of FIGS. 2-4.

Figure 1C:
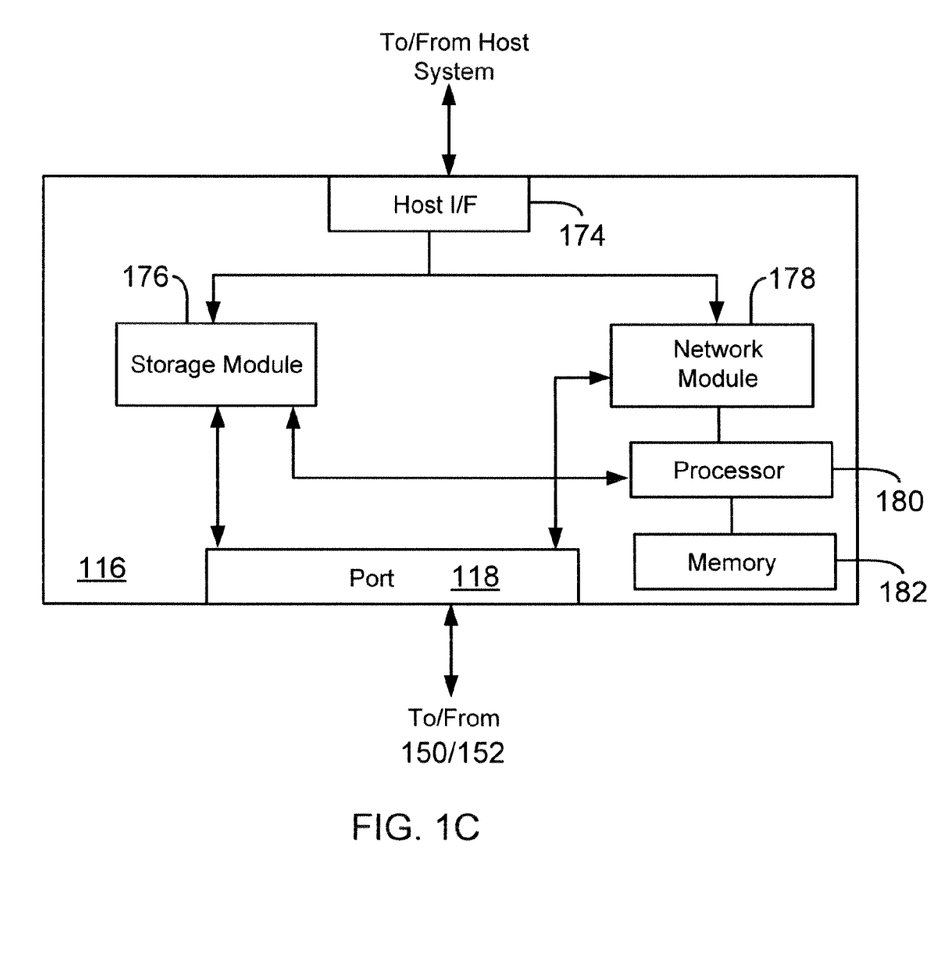
FIG. 1C shows a block diagram of a converged adapter, used according to one embodiment.

Adapter 116:

FIG. 1C shows a block diagram of an adapter 116 used by computing system 102 for both network and storage traffic. Adapter 116 includes a host interface 174 that interfaces with processor 106 and/or other components of host system 102. In one embodiment, host interface 174 includes all the logic and structure for complying with the PCI Express (PCIe) bus standard used for interfacing adapter 116 with host 102.

Adapter 116 includes a storage module 176 that includes logic for handling storage traffic. In one embodiment, storage traffic complies with the Fibre Channel standard.

Adapter 116 includes a network module 178 for handling network traffic. In one embodiment, network module can process Ethernet, Enhanced Ethernet and other network traffic types.

Adapter 116 also includes a processor 180 that controls overall adapter operations. Processor 180 executes firmware instructions out of memory 182.

Port 118 is used for sending and receiving both network/storage packets.

In one embodiment, adapter 116 is a FCoE adapter that sends and receives network and storage traffic using the FCoE standard. An example, of a FCoE adapter is QLE8152, a converged network adapter (CAN) provided by QLogic Corporation.

Figure 2:
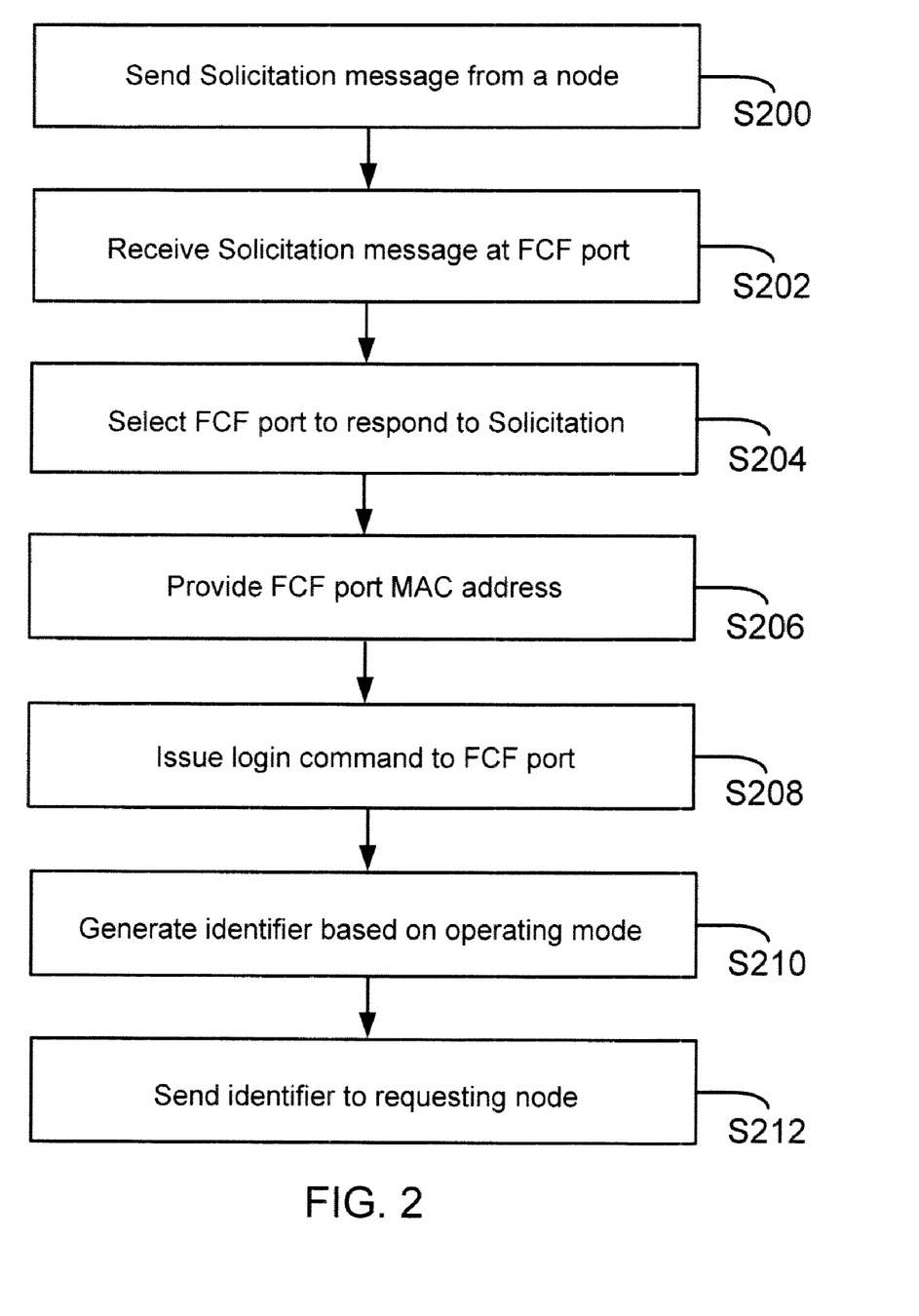
FIGS. 2-4 show process flow diagrams, according to various adaptive embodiments of the present disclosure.

Process Flow Diagrams:

FIG. 2 shows an initialization process flow diagram using device 136, according to one embodiment. The process begins in block S200, when a FIP Solicitation message is broadcast from an ENode (for example, adapter 116 of host system 102). Switch 124 obtains a Media Access Control ("MAC") number of port 118.

In block S202, the FIP Solicitation is received by device 136.

In block S204, a FCF port is selected by controller 166 to respond to the FCF Solicitation. In one embodiment, FCF port selection may be based on load balancing. An active connection count is maintained in memory 168 (shown as forwarding policy in FIG. 1B) and the FCF port with the lowest count may be selected to respond.

In another embodiment, memory 168 stores a mapping table where certain ENodes are mapped to certain FCF ports. For this embodiment, Controller 166 selects a FCF port from the mapping table based on the identity of the ENode that sends the Solicitation.

In block S206, a FCF-MAC address is sent by device 136 to the requesting ENode. In one embodiment, the FCF-MAC address may be stored in memory at device 136 and are recorded at manufacturing time of device 136. The selected FCF port then responds to the requesting ENode with an "Advertisement". The "Advertisement" includes FCF-MAC information and Name Identifier (FCF WWN) and Fabric Name (WWN of a Principal Switch (not shown)).

In block S208, the ENode issues a login command to the FCF port that responded to the Solicitation in block S200. In one embodiment, the login command is a PIP FLOGI command.

In block S210, the FCF port generates an identifier value. The identifier may depend on the operating mode of the switch. For example, if the device 136 is operating as a standard Fibre Channel switch, then device 136 assigns a Fibre Channel identifier that includes a Domain value, an Area value and a unique port identifier for the FCF-Port.

If device 136 is operating in the Transparent Mode, then route controller 170 selects a flex port 142 or 144 for connecting the Enode, FCF-Port and the Flex port. The selected flex port then issues a discovery request and a request for an identifier (for example, a virtual N_Port identifier ("NPIV") from the fabric. The selected flex port operates as a virtual N_Port.

The flex port in this mode may be selected based on various factors, for example, load balancing, worldwide number (WWN) mapping and other factors. An active connection is maintained for each port and the flex port with a lowest count may be used. The flex port may be selected based on a mapping table that includes the relationship of VN_Port number or VN_Port WWN to an associated Flex Port.

In block S212, the FC identifier is converted to a MAC value via a mapped MAC process. The MAC value is then sent to the requesting ENode.

Figure 3:
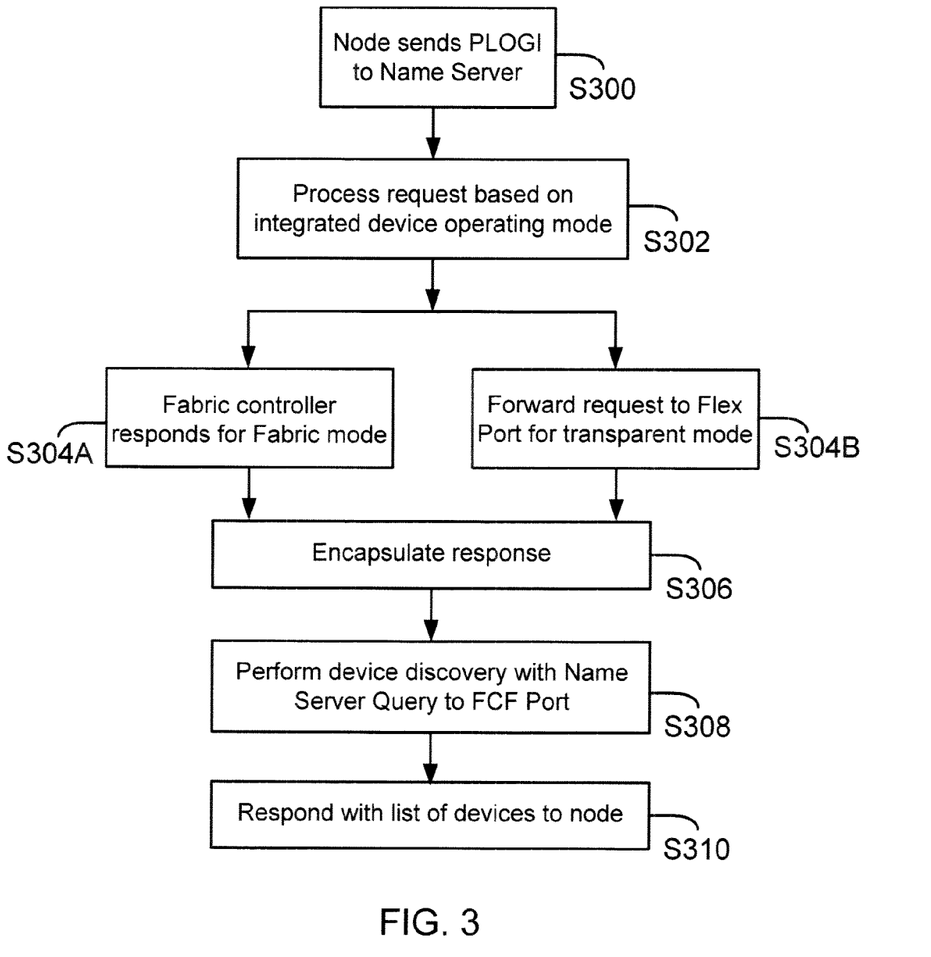

FIG. 3 shows a process flow diagram where a virtual ENode port (VN_Port) communicates with a FCF/Domain controller. The process begins in block S300, when the ENode sends a PLOGI command to the Name Server. The PLOGI request may include a destination Ethernet MAC (i.e. the FCF-MAC for the FCF port); Ethernet source MAC (i.e. the allocated ENode VN_Port MAC) and an embedded FC D_ID value for the domain controller.

In block S302, the PLOGI request is based on the operating mode, as described below with respect to blocks S304A and S304B.

In block S304A, in the standard FC Fabric mode, a local fabric controller (not shown) responds to the PLOGI request.

In block S304B, in the Transparent Mode, the VN_Port's Name Server request is forwarded over an assigned path to the appropriate flex port and then a Fabric switch (not shown), which provides a response.

In block S306, the response is encapsulated in a FCoE Ethernet header. The destination MAC is set to VN_Port's MAC address and the source MAC is set to the FCF-MAC value.

In block S308, the ENode VN_Port performs device discovery with the Name Server queries to the FCF_Port-MAC/Domain Controller, a standard entity defined by FC standards that manages a Name Server data base.

In block S310, the FCF port responds with a list of devices to the VN_Port.

Figure 4:
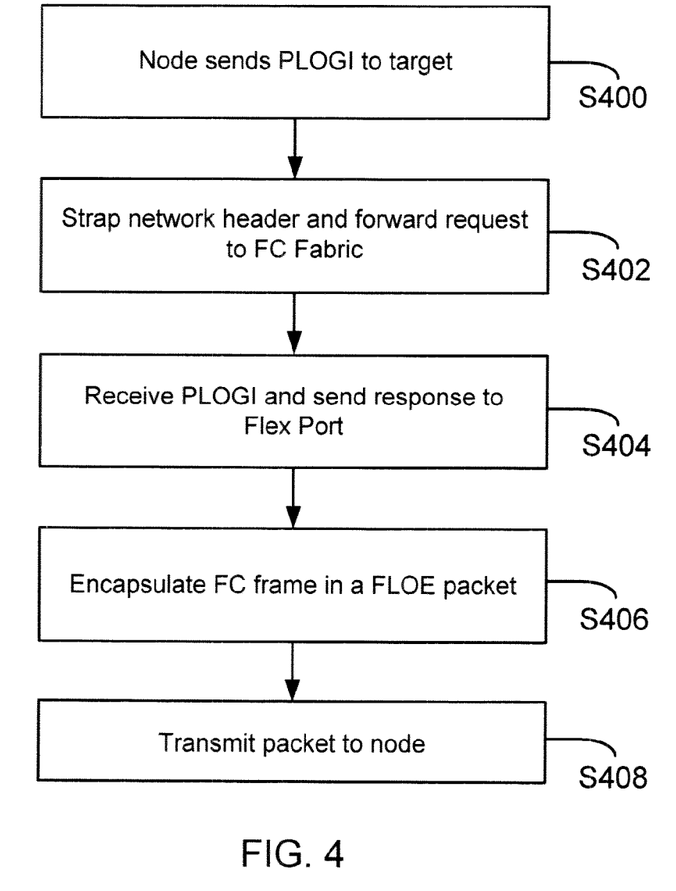

FIG. 4 shows a process flow diagram of FCoE VN_Port to FC N_Port data flow. The process starts in block S400 when the VN_Port sends a PLOGI request to the target. The request may include: Ethernet destination MAC, i.e. the FCF-MAC value, Ethernet source MAC, i.e. the VN_Port MAC value, embedded target FC D_ID and the source FC S_ID, which is the allocated VN_Port FC identifier.

In block S402, the translation module 158 strips the Ethernet header and forwards the PLOGI to the FC Fabric.

In block S404, the target receives and processes the PLOGI request. The target sends a response to the flex port that routes it to the proper translation module 158.

In block S406, the FC response is encapsulated into an FCoE packet. The destination is set to the VN_Port MAC value and the source is set to the FCF-MAC value. Thereafter, in block S408, the packet is sent to switch 124 and ultimately to the VN_Port.

Figure 5:
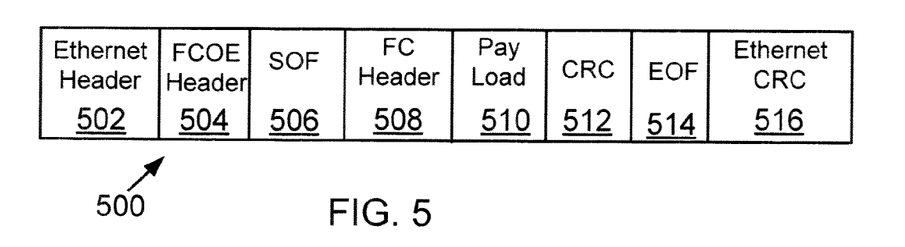
FIG. 5 shows an example of a FCoE packet format.

FCoE Packet Format:

FIG. 5 shows an example of an FCOE packet format 500 for processing network and storage traffic, according to one embodiment. FCOE packet 500 includes an Ethernet header 502. In one embodiment, the Ethernet header 502 may be 14 bytes in length. FCOE packet also includes a FCOE header 504 that includes the Ethernet type and version information. Start of frame (SOF) 506 indicates the beginning of a frame and may be 1 byte.

FCOE packet 500 may also includes a Fibre Channel header (FC Header) 508 that may be 24 bytes long with payload 510. The Fibre Channel cyclic redundancy code (CRC) 512 may be 4 bytes and the end of frame (EOF) 514 may be 1 byte in size. EOF 514 indicates the end of a frame. Ethernet CRC 516 is inserted after EOF 514.

In one embodiment, device 136 having a plurality of FCF Ports is provided. Device 136 operates as a multi-port FCF coordinated by Controller 166 that enables load balancing, failover, Quality of Service and other policy based selection.

In another embodiment, device 136 having a plurality of FCF Ports working as a multi-port FCF, and a set of selection methods is provided. A specific FCF port is selected to respond to a query based on a selectable criterion, for example, the WWN of a Soliciting ENode, the average load level, Quality of Service, total number of connections at any given time and other policy based methods.

In yet another embodiment, device 136 operating in a Transparent FC Switch Mode is provided. During the Transparent Mode, the VN_Port-MAC address is derived from a FCID received in response to the discovery (FDISC) NPIV request to an attached FC switch. The VN_Port-MAC is the Mapped MAC (FCoE ODI II FCID).

In yet another embodiment, device 136 operating in Transparent Mode with a plurality of FCF Ports and Flexible I/O ports operating in FC mode is provided. A Route Controller selects a path for a VN_Port between a FCF Port and one Flexible I/O Port independently for each VN_Port. Path selection may be made based on VN_Port WWPN mapping, and a number of VN_Ports currently assigned to a particular path.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. An integrated device for processing network and storage related traffic, comprising:
   a network port for interfacing with a network switch;
   a plurality of ports that receive a converged storage and network protocol related initialization request; wherein based on a selectable criteria, a controller selects a port from among the plurality of ports to respond to the converged storage and network protocol related initialization request;
   a translation module operationally coupled to the port for translating information between a converged storage and network protocol and a storage protocol;
   a flexible port that is configurable to operate either as a network port, a storage port, or both; wherein a port controller configures a flexible port operating mode; and
   a route controller for selecting a path between the port and the flexible port; wherein the route controller maintains connection information for the flexible port and selects a route to transmit information based on the connection information.

2. The device of claim 1, wherein the network port is an Ethernet port interfacing with an Ethernet switch.

3. The device of claim 1, wherein the converged storage and network protocol is Fibre Channel over Ethernet protocol (FCoE), the storage protocol is Fibre Channel protocol and the network protocol is Ethernet protocol.

4. The device of claim 3, wherein the translation module translates between the FCOE and Fibre Channel protocols.

5. The device of claim 1, wherein the controller selects the port based on an active number of connections that each of the plurality of ports is servicing at any given time.

6. The device of claim 1, wherein the controller selects the port based on an identity of a node sending the initialization request.

7. The device of claim 1, wherein the port controller selects a network connect path between the network port and the flexible port without using the translation module.

8. The device of claim 1, wherein the port controller selects a path using the translation module.

9. The device of claim 1, wherein the flexible port when operating as a storage port, communicates with a Fibre Channel storage system.

10. The device of claim 1, wherein the flexible port when operating as a storage port is configured to operate in a Fibre Channel switch mode.

11. The device of claim 1, wherein the flexible port when operating as a storage port is configured to operate in a transparent mode.

12. An integrated device for processing network and storage related traffic, comprising:
   an Ethernet port for interfacing with an Ethernet switch;
   a plurality of Fibre Channel Forwarding (FCF) ports that receive a Fibre Channel Over Ethernet (FCoE) initialization request from a server node; wherein based on a selectable criteria, a controller selects a FCF port from among the plurality of FCF ports to respond to the FcoE initialization request;
   a translation module operationally coupled to the port for translating information between FCoE and Fibre Channel protocols;
   a flexible port that is configurable to operate as either a Fibre Channel port in a Fibre Channel switch mode or a transparent mode for communicating with a Fibre Channel storage system; or to operate as a network port communicating with a network device, or both; wherein a port controller configures a flexible port operating mode; and
   a route controller for selecting a path between the port and the flexible port; wherein the route controller maintains connection information for the flexible port and selects a route to transmit information based on the connection information.

13. The device of claim 12, wherein the controller selects the FCF port based on an active number of connections that each of the plurality of FCF ports is servicing at any given time.

14. The device of claim 12, wherein the controller selects the FCF port based on an identity of the server node sending the initialization request.

15. The device of claim 12, wherein the port controller selects an Ethernet path between the Ethernet port and the flexible port without using the translation module.

16. The device of claim 12, wherein the port controller selects a path using the translation module.

17. A system, comprising:
a server node for sending network and storage related information;
a network switch communicating with the server node and an integrated device, the integrated device configured to process both network and storage related information; wherein the integrated device comprises:
a network port for interfacing with a network switch;
a plurality of ports that receive a converged storage and network protocol related initialization request; wherein based on a selectable criteria, a controller selects a port from among the plurality of ports to respond to the converged storage and network protocol related initialization request;
a translation module operationally coupled to the port for translating information between a converged storage and network protocol and a storage protocol; and a flexible port that is configurable to operate either as a network port, a storage port, or both; wherein a port controller configures a flexible port operating mode; and
a route controller for selecting a path between the port and the flexible port; wherein the route controller maintains connection information for the flexible port and selects a route to transmit information based on the connection information.

18. The system of claim 17, wherein the network port is an Ethernet port interfacing with an Ethernet switch.

19. The system of claim 17, wherein the converged storage and network protocol is Fibre Channel over Ethernet protocol (FCoE), the storage protocol is Fibre Channel protocol and the network protocol is Ethernet protocol.

20. The system of claim 19, wherein the translation module translates between the FCOE and Fibre Channel protocols.

21. The system of claim 17, wherein the controller selects the port based on an active number of connections that each of the plurality of ports is servicing at any given time.

22. The system of claim 17, wherein the controller selects the port based on an identity of a server node sending the initialization request.

23. The system of claim 17, wherein the port controller selects a network connect path between the network port and the flexible port without using the translation module.

24. The system of claim 17, wherein the port controller selects a path using the translation module.

25. The system of claim 17, wherein the flexible port when operating as a storage port, communicates with a Fibre Channel storage system.

26. The system of claim 17, wherein the flexible port when operating as a storage port is configured to operate in a Fibre Channel switch mode.

27. The system of claim 17, wherein the flexible port when operating as a storage port is configured to operate in a transparent mode.

* * * * *

UNITED STATES PATENT AND TRADEMARK OFFICE
CERTIFICATE OF CORRECTION

PATENT NO. : 8,351,442 B1
APPLICATION NO. : 12/505430
DATED : January 8, 2013
INVENTOR(S) : Edward C. McGlaughlin Page 1 of 1

It is certified that error appears in the above-identified patent and that said Letters Patent is hereby corrected as shown below:

In the Specifications:

In column 2, line 50, delete "Port" and insert -- port --, therefor.

In column 3, line 27, delete "1-known" and insert -- well-known --, therefor.

In column 3, line 34, delete "D)" and insert -- (ID) --, therefor.

In column 8, line 3, delete "PIP" and insert -- FIP --, therefor.

In column 8, line 47, after "to" insert -- the --.

In column 9, line 37, delete "ODI" and insert -- OUI --, therefor.

Signed and Sealed this
Fourteenth Day of May, 2013

Teresa Stanek Rea
*Acting Director of the United States Patent and Trademark Office*